(12) United States Patent
Yasuoka et al.

(10) Patent No.: US 7,544,442 B2
(45) Date of Patent: Jun. 9, 2009

(54) HYDROGEN-ABSORBING ALLOY ELECTRODE AND ALKALINE STORAGE BATTERY

(75) Inventors: Shigekazu Yasuoka, Kobe (JP);
Yoshifumi Magari, Kobe (JP);
Tetsuyuki Murata, Kobe (JP);
Tadayoshi Tanaka, Takatsuki (JP); Jun Ishida, Kobe (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 488 days.

(21) Appl. No.: 11/169,901

(22) Filed: Jun. 30, 2005

(65) Prior Publication Data

US 2006/0046141 A1    Mar. 2, 2006

(30) Foreign Application Priority Data

Aug. 25, 2004   (JP)   .............................. 2004-245655
Jun. 14, 2005   (JP)   .............................. 2005-173072

(51) Int. Cl.
*H01M 4/58*   (2006.01)
(52) U.S. Cl. .................... 429/218.2; 420/900
(58) Field of Classification Search ...................... None
See application file for complete search history.

(56) References Cited

U.S. PATENT DOCUMENTS 5,840,440 A  * 11/1998  Ovshinsky et al. ............ 429/60
6,130,006 A    10/2000  Kohno et al.
6,248,475 B1 *  6/2001  Hayashida et al. ....... 429/218.2

FOREIGN PATENT DOCUMENTS

JP   11-323469    11/1999
JP   2001-291511  10/2001

OTHER PUBLICATIONS

IPDL machine translation of JP 2001-291511.*

* cited by examiner

*Primary Examiner*—Patrick Ryan
*Assistant Examiner*—Maria J Laios
(74) *Attorney, Agent, or Firm*—Westerman, Hattori, Daniels & Adrian, LLP.

(57) ABSTRACT

A hydrogen-absorbing alloy for a negative electrode in an alkaline storage battery includes a first hydrogen-absorbing alloy and a second first hydrogen-absorbing alloy. The first hydrogen-absorbing alloy contains at least a rare-earth element, Mg, Ni, and Al, and has an intensity ratio $I_A/I_B$ of 0.1 or greater in X-ray diffraction analysis using Cu—K$\alpha$ radiation as an X-ray source, where $I_A$ is the strongest peak intensity that appears in the range of $2\theta=31°$ to $33°$, and $I_B$ is the strongest peak intensity that appears in the range of $2\theta=40°$ to $44°$. The second hydrogen-absorbing alloy has a Co content greater than that of the first hydrogen-absorbing alloy.

8 Claims, 2 Drawing Sheets

HYDROGEN-ABSORBING ALLOY ELECTRODE AND ALKALINE STORAGE BATTERY

RELATED APPLICATIONS

This application claims priority from Japanese Patent Application Nos. 2004-245655 and 2005-173072, which are hereby incorporated by reference.

BACKGROUND OF THE INVENTION

1. Field of the Invention

This invention relates to hydrogen-absorbing alloy electrodes and alkaline storage batteries utilizing the hydrogen-absorbing alloy electrodes for their negative electrodes. More particularly, a feature of the invention is an improvement in a hydrogen-absorbing alloy electrode used in an alkaline storage battery, which utilizes, for the purpose of enhancing the capacity of the alkaline storage battery, a hydrogen-absorbing alloy containing at least a rare-earth element, magnesium, nickel, and aluminum and having an intensity ratio $I_A/I_B$ of 0.1 or greater in X-ray diffraction analysis using Cu—Kα radiation as an X-ray source, where $I_A$ is the strongest peak intensity that appears in the range $2\theta=31°$ to $33°$ and $I_B$ is the strongest peak intensity that appears in the range $2\theta=40°$ to $44°$, whereby the cycle life of the alkaline storage battery is improved.

2. Description of Related Art

Conventionally, nickel-cadmium storage batteries have been commonly used as alkaline storage batteries. In recent years, nickel-metal hydride storage batteries using a hydrogen-absorbing alloy as a material for their negative electrodes have drawn considerable attention from the viewpoints that they have higher capacity than nickel-cadmium storage batteries and, being free of cadmium, they are more environmentally safe.

As the nickel-metal hydride storage batteries have been used in various portable devices, demands for further higher performance in the nickel-metal hydride storage batteries have been increasing.

In the nickel-metal hydride storage batteries, hydrogen-absorbing alloys such as a rare earth-nickel hydrogen-absorbing alloy having a $CaCu_5$ crystal structure as its main phase and a Laves phase hydrogen-absorbing alloy containing Ti, Zr, V and Ni have been generally used for their negative electrodes.

However, these hydrogen-absorbing alloys generally do not necessarily have sufficient hydrogen-absorbing capability, and it has been difficult to increase the capacity of the nickel-metal hydride storage batteries further.

In recent years, in order to improve the hydrogen-absorbing capability of the rare earth-nickel hydrogen-absorbing alloy, it has been proposed to use a hydrogen-absorbing alloy having a $Ce_2Ni_7$ type or a $CeNi_3$ type crystal structure, rather than the $CaCu_5$ type, by adding Mg or the like to the rare earth-nickel hydrogen-absorbing alloy. (See, for example, Japanese Published Unexamined Patent Application No. 11-323469.)

Nevertheless, a problem in using the above-described hydrogen-absorbing alloy for the negative electrode of an alkaline storage battery has been that repeated charge-discharge cycles cause alkaline electrolyte solution within its separator to dry up, degrading the cycle life of the alkaline storage battery.

BRIEF SUMMARY OF THE INVENTION

Accordingly, it is an object of the present invention to prevent alkaline electrolyte solution within a separator from drying up in an alkaline storage battery using a hydrogen-absorbing alloy electrode as its negative electrode and thereby improve the cycle life of the alkaline storage battery, even when the alkaline storage battery is charged and discharged repeatedly. The hydrogen-absorbing alloy electrode utilizes a hydrogen-absorbing alloy that forms a crystal structure other than the $CaCu_5$ crystal structure due to addition of Mg or the like to a rare earth-nickel hydrogen absorbing alloy, particularly a hydrogen-absorbing alloy containing at least a rare-earth element, magnesium, nickel, and aluminum and having an intensity ratio $I_A/I_B$ of 0.1 or greater in X-ray diffraction analysis using Cu—Kα radiation as an X-ray source, where $I_A$ is the strongest peak intensity that appears in the range of $2\theta=31°$ to $33°$, and $I_B$ is the strongest peak intensity that appears in the range of $2\theta=40°$ to $44°$.

A hydrogen-absorbing alloy electrode of the invention comprises: a first hydrogen-absorbing alloy containing at least a rare-earth element, magnesium, nickel, and aluminum, and having an intensity ratio $I_A/I_B$ of 0.1 or greater in X-ray diffraction analysis using Cu—Kα radiation as an X-ray source, where $I_A$ is the strongest peak intensity that appears in the range of $2\theta=31°$ to $33°$, and $I_B$ is the strongest peak intensity that appears in the range of $2\theta=40°$ to $44°$; and a second hydrogen-absorbing alloy having a cobalt content greater than the first hydrogen-absorbing alloy, and being added to the first hydrogen-absorbing alloy.

An alkaline storage battery according to the invention utilizes a negative electrode that is the foregoing hydrogen-absorbing alloy electrode.

Herein, to enhance the capacity of the hydrogen-absorbing alloy electrode and improve the cycle life of the alkaline storage battery, it is preferable to use as the foregoing first hydrogen-absorbing alloy a hydrogen-absorbing alloy represented the general formula $Ln_{1-x}Mg_xNi_{y-a}Al_a$, where Ln is an element selected from rare-earth elements, $0.10 \leq x \leq 0.30$, $3 \leq y \leq 3.6$, and $0 \leq a \leq 0.3$. Moreover, in the hydrogen-absorbing alloy represented by the general formula, a portion or portions of the Ln and/or Ni may be substituted by at least one element selected from the group consisting of V, Nb, Ta, Cr, Mo, Mn, Fe, Co, Ga, Zn, Sn, In, Cu, Si, P, and B.

In this invention, the hydrogen-absorbing alloy electrode used as the negative electrode of the alkaline storage battery utilizes, as described above, the first hydrogen-absorbing alloy containing at least a rare-earth element, magnesium, nickel, and aluminum, and having an intensity ratio $I_A/I_B$ of 0.1 or greater in X-ray diffraction analysis using Cu—Kα radiation as an X-ray source, where $I_A$ is the strongest peak intensity that appears in the range of $2\theta=31°$ to $33°$, and $I_B$ is the strongest peak intensity that appears in the range of $2\theta=40°$ to $44°$; therefore, the first hydrogen-absorbing alloy has high hydrogen-absorbing capability, making it possible to attain a high-capacity alkaline storage battery.

Moreover, in this invention, the second hydrogen-absorbing alloy having a higher cobalt content than the first hydrogen-absorbing alloy is added to the first hydrogen-absorbing alloy; therefore, as the alkaline storage battery is charged and discharged, a cobalt compound is deposited onto the separator from the hydrogen-absorbing alloy, especially from the second hydrogen-absorbing alloy, which has a greater cobalt content. Due to the cobalt compound deposited on the separator, the retention of the alkaline electrolyte solution in the separator improves, inhibiting the alkaline electrolyte solution within the separator from drying out. Consequently, the cycle life of the alkaline storage battery is prevented from degrading.

It may seem possible to increase the cobalt content in the first hydrogen-absorbing alloy, instead of the addition of the second hydrogen-absorbing alloy having a greater cobalt content to the first hydrogen-absorbing alloy. Nevertheless, increasing the cobalt content in the first hydrogen-absorbing alloy in that way makes the first hydrogen-absorbing alloy prone to pulverization and thereby lowers its corrosion resistance, consequently leading to degradation in the cycle life of the alkaline storage battery.

If the amount of cobalt contained in the second hydrogen-absorbing alloy is small with respect to the total amount of cobalt contained in the first and second hydrogen-absorbing alloys in the case of adding the second hydrogen-absorbing alloy having a greater cobalt content to the first hydrogen-absorbing alloy, the amount of cobalt compound deposited on the separator becomes accordingly small, leading to degradation in the cycle life of the alkaline storage battery. On the other hand, in order to increase the amount of cobalt compound deposited on the separator, it is necessary to increase the amount of cobalt contained in the first hydrogen-absorbing alloy. This results in lower corrosion resistance of the first hydrogen-absorbing alloy as described above, leading to degradation in the cycle life of the alkaline storage battery. For these reasons, it is preferable that the amount of cobalt contained in the second hydrogen-absorbing alloy be 25 weight % or greater with respect to the total amount of cobalt contained in the first and the second hydrogen-absorbing alloys, and more preferably be within the range of from 50 to 75 weight %.

If the amount of the second hydrogen-absorbing alloy to be added to the first hydrogen-absorbing alloy is small, the amount of cobalt compound deposited on the separator is accordingly small, leading to degradation in the cycle life of the alkaline storage battery. On the other hand, if the amount of the second hydrogen-absorbing alloy add is too large, the amount of the first hydrogen-absorbing alloy, which has high hydrogen-absorbing capability, becomes small correspondingly, degrading the capacity of the alkaline storage battery. For these reasons, it is preferable that the amount of the second hydrogen-absorbing alloy be within the range of from 5 to 50 weight % with respect to the total amount of the first and the second hydrogen-absorbing alloys, and more preferably be within the range of from 15 to 30 weight %.

Although the foregoing second hydrogen-absorbing alloy having a greater cobalt content may have the same crystal structure as that of the first hydrogen-absorbing alloy, the second hydrogen-absorbing alloy tends to be prone to pulverization in this case, as with the first hydrogen-absorbing alloy, resulting in lower corrosion resistance. On the other hand, a hydrogen-absorbing alloy having a $CaCu_5$ crystal structure exhibits higher corrosion resistance when its cobalt content is greater. Therefore, it is preferable that a hydrogen-absorbing alloy having a $CaCu_5$ crystal structure be used as the second hydrogen-absorbing alloy having a greater cobalt content.

When a hydrogen-absorbing alloy has a greater particle size, its corrosion resistance is better. Therefore, it is preferable that the foregoing first hydrogen-absorbing alloy have a large particle size. On the other hand, it is preferable that the second hydrogen-absorbing alloy, which has a large cobalt content, have a small particle size to have a greater specific surface area so that the cobalt can dissolve therefrom appropriately. For this reason, it is preferable that the second hydrogen-absorbing alloy have an average particle diameter smaller than the average particle diameter of the first hydrogen-absorbing alloy.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Hereinbelow, hydrogen-absorbing alloy electrodes and alkaline storage batteries according to embodiments of the invention are specifically described, and it will be demonstrated by the comparison with comparative examples that the cycle life is improved in the alkaline storage batteries. It should be construed, however, that the hydrogen-absorbing alloy electrode and the alkaline storage battery according to the invention are not limited to those illustrated in the following embodiments, and various changes and modifications may be made unless such changes and modifications depart from the scope of the invention.

EXAMPLES 1 TO 7

Examples 1 though 7 utilized a first hydrogen-absorbing alloy fabricated in the following manner.

The first hydrogen-absorbing alloy that was fabricated as follows. Mg, Ni, Al, and Co as well as rare-earth elements La, Pr, and Nd were mixed together to produce a predetermined alloy composition, and the mixture was then melted at 1500° C. by an induction furnace and then cooled to prepare hydrogen-absorbing alloy ingots. The composition of the hydrogen-absorbing alloy thus prepared was analyzed by ICP (inductively-coupled plasma optical emission spectroscopy). As a result, the composition of the hydrogen-absorbing alloy was found to be $(La_{0.2}Pr_{0.4}Nd_{0.4})_{0.83}Mg_{0.17}Ni_{3.03}Al_{0.17}Co_{0.10}$, and the content of Co in the hydrogen-absorbing alloy was 2.0 weight %.

Subsequently, the resultant hydrogen-absorbing alloy ingot was mechanically pulverized in an inert atmosphere and classified to obtain a first hydrogen-absorbing alloy powder having the above-described composition. The particle size distribution of the resultant first hydrogen-absorbing alloy powder was measured with a laser diffraction/scattering particle size analyzer, and the weight-average particle size was found to be 65 µm.

Figure 1:
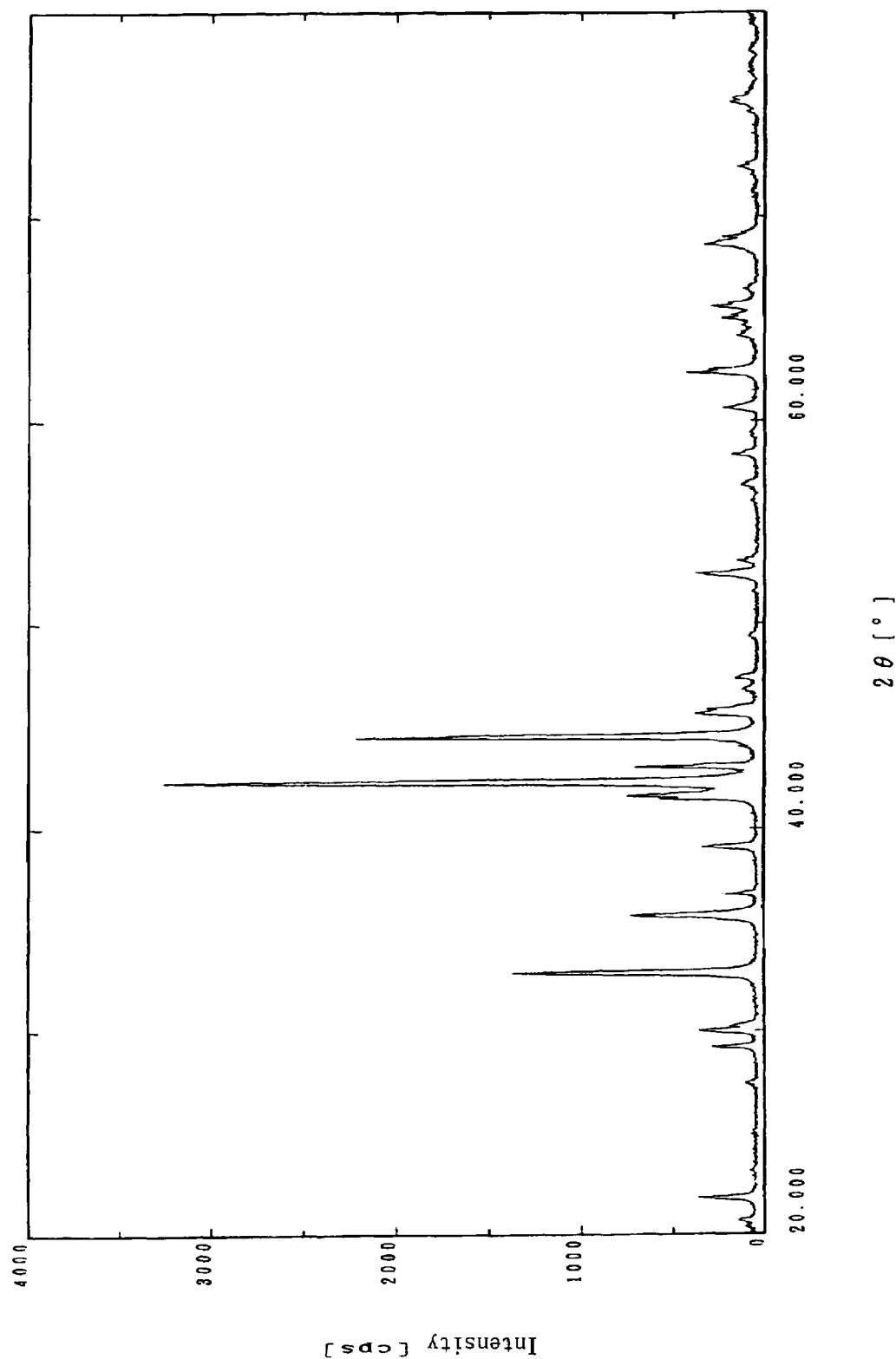
FIG. 1 is a graph illustrating the result of an X-ray diffraction analysis for a first hydrogen-absorbing alloy, used in Examples 1 to 8 and Comparative Examples 1 and 2 of the invention.

Further, the first hydrogen-absorbing alloy powder thus obtained was milled with a mortar and subjected to X-ray diffraction analysis using an X-ray diffraction analyzer employing a Cu—Kα tube as an X-ray source at a scan speed of 1°/min, a tube voltage of 40 kV, and a tube current of 40 mA. The result of the analysis is shown in FIG. 1. The result shows that the foregoing hydrogen-absorbing alloy had peaks that substantially match those of the hydrogen-absorbing alloy having a $Ce_2Ni_7$ crystal structure, which means that the foregoing hydrogen-absorbing alloy had a crystal structure other than the $CaCu_5$ type. In addition, the foregoing hydrogen-absorbing alloy had an intensity ratio $I_A/I_B$ of 0.42, where $I_A$ is the strongest peak intensity that appears in the range of $2\theta=31°$ to $33°$, and $I_B$ is the strongest peak intensity that appears in the range of $2\theta=40°$ to $44°$.

In addition, each of Examples 1 to 6 used as a second hydrogen-absorbing alloy hydrogen-absorbing alloy powder the alloy composition of which was $(La_{0.80}Ce_{0.14}Pr_{0.02}Nd_{0.04})Ni_{3.69}Co_{0.90}Mn_{0.10}Al_{0.29}$ and the weight-average particle size of which was 75 μm. Example 7 used as a second hydrogen-absorbing alloy hydrogen-absorbing alloy powder having the same alloy composition as those of Examples 1 to 6, $(La_{0.80}Ce_{0.14}Pr_{0.02}Nd_{0.04})Ni_{3.69}Co_{0.90}Mn_{0.10}Al_{0.29}$, but it had a weight-average particle size of 35 μm. These second hydrogen-absorbing alloys had a $CaCu_5$ crystal structure, and the Co content in the second hydrogen-absorbing alloys was 12.3 weight %.

Then, the foregoing first hydrogen-absorbing alloy powder and the foregoing second hydrogen-absorbing alloy powder were mixed at weight ratios of 95:5 for Example 1, 90:10 for Example 2, 85:15 for Example 3, 80:20 for Example 4, 70:30 for Example 5, 50:50 for Example 6, and 95:5 for Example 7.

Here, the weight ratio $(W_2/W_{1+2}) \times 100$ of the amount of Co contained in the second hydrogen-absorbing alloy powder ($W_2$) with respect to the amount of the total amount of Co contained in the mixed hydrogen-absorbing alloy powder ($W_{1+2}$), in which the first hydrogen-absorbing alloy powder and the second hydrogen-absorbing alloy powder were mixed, was calculated for each of the foregoing examples. The weight ratios ($W_2/W_{1+2}$) were, as shown in Table 1 below, 25 weight % for Example 1, 41 weight % for Example 2, 53 weight % for Example 3, 61 weight % for Example 4, 73 weight % for Example 5, 86 weight % for Example 6, and 25 weight % for Example 7.

Next, 0.4 parts by weight of sodium polyacrylic acid, 0.1 parts by weight of carboxymethylcellulose, and 2.5 parts by weight of polytetrafluoroethylene dispersion solution with a solid content of 60 weight % were mixed with 100 parts by weight of each of the hydrogen-absorbing alloy powders in which the first hydrogen-absorbing alloy powder and the second hydrogen-absorbing alloy powder were mixed, to prepare pastes. The prepared pastes were applied onto both sides of conductive cores each made of a 60-μm thick nickel-plated punched metal and then dried. The resultant material was pressed and thereafter cut into predetermined dimensions. Thus, hydrogen-absorbing alloy electrodes used for negative electrodes were prepared.

Meanwhile, positive electrodes were prepared as follows. Nickel hydroxide powder containing 2.5 weight % of zinc and 1.0 weight % of cobalt was put into an aqueous solution of cobalt sulfate, and 1 mole of aqueous solution of sodium hydroxide was gradually dropped into the mixture with stirring to cause them to react with each other until the pH became 11; thereafter, the resulting precipitate was filtered, washed with water, and vacuum dried. Thus, nickel hydroxide the surface of which was coated with 5 weight % of cobalt hydroxide was obtained. Then, a 25 weight % aqueous solution of sodium hydroxide was added and impregnated to the nickel hydroxide the surface of which was coated with cobalt hydroxide, at a weight ratio of 1:10, and the resultant was annealed at 85° C. for 8 hours with stirring; thereafter, this was washed with water and dried, whereby a positive electrode material was obtained, in which the surface of the nickel hydroxide was coated with sodium-containing cobalt oxide.

Then, 95 parts by weight of the positive electrode material thus prepared, 3 parts by weight of zinc oxide, and 2 parts by weight of cobalt hydroxide were mixed together, and 50 parts by weight of an aqueous solution of 0.2 weight % hydroxypropylcellulose was added to the mixture and mixed together to prepare a slurry, which was then filled into a nickel foam. The resultant was dried and pressed, and thereafter cut into predetermined dimensions. Thus, positive electrodes were prepared, each of which was composed of a non-sintered nickel electrode.

Figure 2:
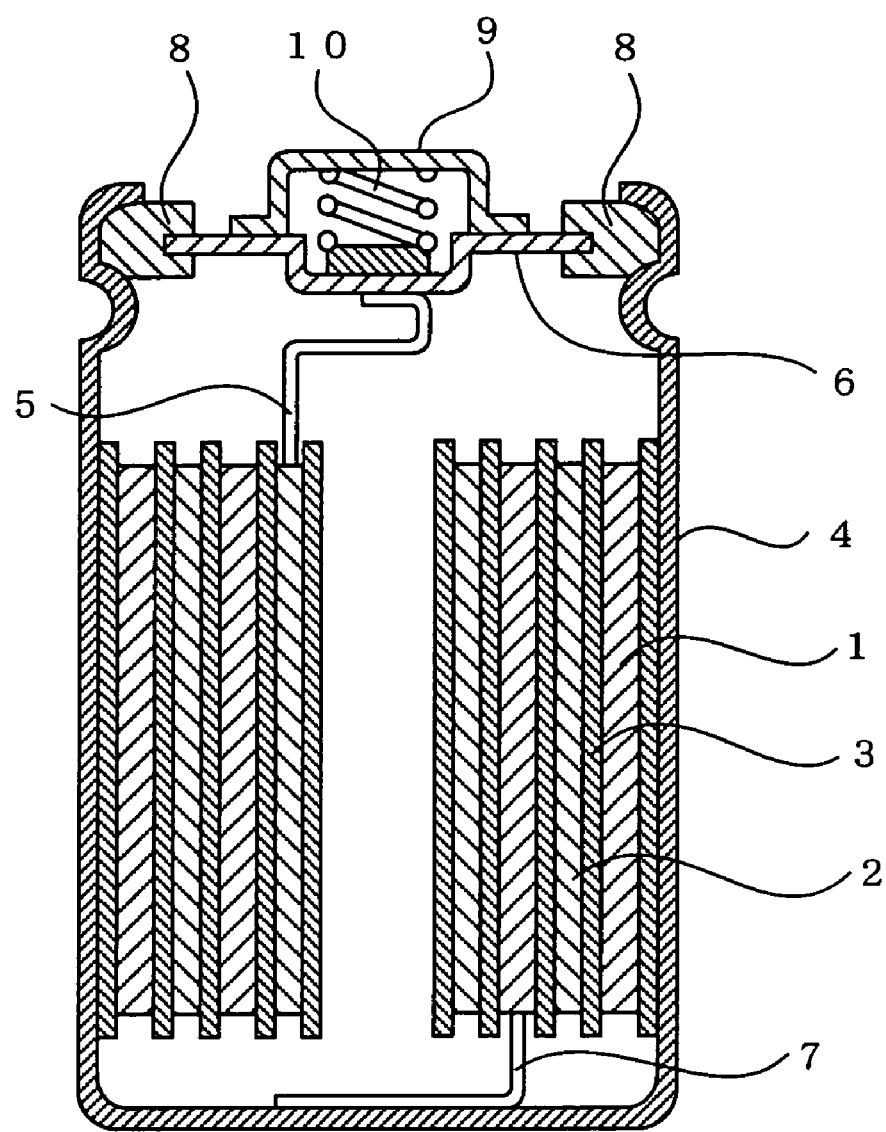
FIG. 2 is a schematic cross-sectional view illustrating an alkaline storage battery, fabricated in Examples 1 to 8 and Comparative Examples 1 and 2 of the invention.

A nonwoven fabric made of polypropylene was used as a separator. An alkaline electrolyte solution used was an alkaline aqueous solution containing KOH, NaOH, and LiOH—$H_2O$ at a weight ratio of 8:0.5:1 in the total quantity of 30 weight %. Using these components, alkaline storage batteries of Examples 1 to 7 were fabricated, each of which had a design capacity of 1500 mAh and a cylindrical shape as illustrated in FIG. 2.

Each of the alkaline storage batteries was fabricated in the following manner. A positive electrode 1 and a negative electrode 2 were spirally coiled with a separator 3 interposed therebetween, as illustrated in FIG. 2, and these were accommodated in a battery can 4. Then, 2.4 g of the alkaline electrolyte solution was poured into the battery can 4. Thereafter, an insulative packing 8 was placed between the battery can 4 and a positive electrode cap 6, and the battery can 4 was sealed. The positive electrode 1 was connected to the positive electrode cap 6 via a positive electrode lead 5, and the negative electrode 2 was connected to the battery can 4 via a negative electrode lead 7. The battery can 4 and the positive electrode cap 6 were electrically insulated by the insulative packing 8. A coil spring 10 was placed between the positive electrode cap 6 and a positive electrode external terminal 9. The coil spring 10 can be compressed to release gas from the interior of the battery to the atmosphere when the internal pressure of the battery unusually increases.

Comparative Example 1

In Comparative Example 1, the negative electrode was prepared using the foregoing first hydrogen-absorbing alloy powder alone as its hydrogen-absorbing alloy, which had an alloy composition of $(La_{0.2}Pr_{0.4}Nd_{0.4})_{0.83}Mg_{0.17}Ni_{3.03}Al_{0.17}Co_{0.10}$ and a weight-average particle size of 65 μm. An alkaline storage battery of Comparative Example 1 was fabricated in the same manner as in the foregoing examples except for the negative electrode.

Next, the alkaline storage batteries of Examples 1 to 7 and Comparative Example 1 were charged at a current of 150 mA for 16 hours and then discharged at a current of 1500 mA until the battery voltage became 1.0 V. This charging and discharging process was repeated three times to activate the alkaline storage batteries of Examples 1 to 7 and Comparative Example 1.

Then, each of the alkaline storage batteries of Examples 1 to 7 and Comparative Example 1 that were activated in the above-described manner was charged at a current of 1500 mA. After the battery voltage reached the maximum value, each battery was further charged until the voltage lowered 10 mV and thereafter discharged at a current of 1500 mA until the battery voltage reached 1.0 V This charge-discharge cycle was repeated to obtain the number of cycles for each battery until the discharge capacity of each battery lowered to 80% of the discharge capacity at the first cycle.

Then, the cycle life of each of the alkaline storage batteries was determined using relative indices wherein the cycle number of the alkaline storage battery of Comparative Example 1 was taken as 100. The results are shown in Table 1 below.

TABLE 1

| | Weight ratio of hydrogen-absorbing alloys | | Average particle diameter of second hydrogen-absorbing alloy (μm) | (W2/W1 + 2) × 100 (wt. %) | Cycle life |
|---|---|---|---|---|---|
| | First | Second | | | |
| Ex. 1 | 95 | 5 | 75 | 25 | 123 |
| Ex. 2 | 90 | 10 | 75 | 41 | 145 |
| Ex. 3 | 85 | 15 | 75 | 53 | 164 |
| Ex. 4 | 80 | 20 | 75 | 61 | 165 |
| Ex. 5 | 70 | 30 | 75 | 73 | 176 |
| Ex. 6 | 50 | 50 | 75 | 86 | 127 |
| Ex. 7 | 95 | 5 | 35 | 25 | 132 |
| Comp. Ex. 1 | 100 | 0 | — | — | 100 |

The results demonstrate that the alkaline storage batteries of Examples 1 to 7, which utilized, as the hydrogen-absorbing alloy in their negative electrode, the hydrogen-absorbing alloy containing the foregoing first hydrogen-absorbing alloy powder and the second hydrogen-absorbing alloy powder, added to the first hydrogen-absorbing alloy, that has a cobalt content greater than that of the first hydrogen-absorbing alloy, exhibited a remarkable improvement in cycle life over the alkaline storage battery of Comparative Example 1, which did not contain the second hydrogen-absorbing alloy powder.

In addition, a comparison among the alkaline storage batteries of Examples 1 to 6 proves that the alkaline storage batteries of Examples 3 to 5, in which the weight ratios of the second hydrogen-absorbing alloy powder were in the range of 15 to 30 weight % and the weight ratios of the amount of Co contained in the second hydrogen-absorbing alloy powder ($W_2$) with respect to the total amount of Co in the hydrogen-absorbing alloy powder ($W_{1+2}$) were in the range of 50 to 75 weight %, exhibited further improvements in cycle life.

Moreover, a comparison between the alkaline storage batteries of Examples 1 and 7, which had the same weight ratio of the second hydrogen-absorbing alloy powder and the same weight ratio of the Co content contained in the second hydrogen-absorbing alloy powder ($W_2$) with respect to the total Co content contained in the entire hydrogen-absorbing alloy powder ($W_{1+2}$), indicates that the alkaline storage battery of Example 7, which had a greater weight-average particle size, exhibited a longer cycle life.

Next, the foregoing alkaline storage batteries of Example 1 and Comparative Example 1 were subjected to 50 cycles of charge and discharge, and thereafter the alkaline storage batteries were disassembled to take out the separators.

The separators thus taken out were washed with water for 5 hours and vacuum dried for 16 hours. Thereafter, the amounts of alkaline electrolyte solution remaining in the separators were measured. In Table 2 below the results are represented by relative indices, wherein the amount of the alkaline electrolyte solution contained in the separator of Comparative Example 1 is taken as 100.

Subsequently, the metallic substances contained in the separators were dissolved with hydrochloric acid, and the amounts of Co and the amounts of Mn contained in the separators were measured by ICP (inductively-coupled plasma optical emission spectroscopy). In Table 2 below the results are represented by relative indices, wherein the amount of Co and the amount of Mn contained in the separator of Comparative Example 1 are taken as 100.

TABLE 2

| | Amounts in the separators | | |
|---|---|---|---|
| | Alkaline electrolyte solution | Co | Mn |
| Ex. 1 | 119 | 112 | 2400 |
| Comp. Ex. 1 | 100 | 100 | 100 |

The results demonstrate that in the alkaline storage battery of Example 1, the amount of alkaline electrolyte solution remaining within the separator, the amount of Co and the amount of Mn contained within the separator were all greater than those in the alkaline storage battery of Comparative Example 1.

Next, an experiment was conducted in which the types of the second hydrogen-absorbing alloys to be added were varied, in order to find which of Co or Mn contained in the separators influenced cycle life of the alkaline storage batteries.

Example 8 and Comparative Example 2

Example 8 used, as the second hydrogen-absorbing alloy, a hydrogen-absorbing alloy power having a weight-average particle size of 53 μm and an alloy composition of $(La_{0.80}Ce_{0.14}Pr_{0.02}Nd_{0.04})$ $Ni_{3.49}Co_{0.90}Mn_{0.30}Al_{0.29}$. This second hydrogen-absorbing alloy also had a $CaCu_5$ crystal structure, and the Co content in the second hydrogen-absorbing alloy was 12.2 weight %.

Comparative Example 2 used, as the second hydrogen-absorbing alloy, a hydrogen-absorbing alloy powder having a weight-average particle size of 65 μm and an alloy composition of $La_{0.17}Pr_{0.33}Nd_{0.33}Mg_{0.17}Ni_{2.6}Mn_{0.5}Al_{0.2}$, which contained Mn but did not contain Co. This second hydrogen-absorbing alloy had a $Ce_2Ni_7$ crystal structure.

Then, the above-described second hydrogen-absorbing alloy powders were mixed with the same first hydrogen-absorbing alloy powder as those used for Examples 1 to 7, at a weight ratio of 90:10 for Example 8 and a weight ratio of 98:2 for Comparative Example 2. Alkaline storage batteries of Example 8 and Comparative Example 2 were fabricated in the same manner as in Examples 1 to 7 above except for the hydrogen-absorbing alloys. In the battery of Example 8, the weight ratio ($W_2/W_{1+2}$)×100 of the amount of Co contained in the second hydrogen-absorbing alloy powder ($W_2$) with respect to the total amount of Co contained in the mixed hydrogen-absorbing alloy powder ($W_{1+2}$), in which the first hydrogen-absorbing alloy powder and the second hydrogen-absorbing alloy powder were mixed, was 25 weight %.

Next, the alkaline storage batteries of Example 8 and Comparative Example 2 thus fabricated were subjected to a cycle life measurement in the same manner as in the case of Examples 1 to 7 and Comparative Example 1 above. In Table 3 below the results are represented by relative indices, wherein the cycle life of the alkaline storage battery of Comparative Example 1 is taken as 100. Table 3 also shows the results for Example 2 and Comparative Example 1.

TABLE 3

| | Weight ratio of hydrogen-absorbing alloys | | Composition of | Cycle |
|---|---|---|---|---|
| | First | Second | second hydrogen-absorbing alloy | life |
| Ex. 8 | 90 | 10 | $(La_{0.80}Ce_{0.14}Pr_{0.02}Nd_{0.04})Ni_{3.49}Co_{0.90}Mn_{0.30}Al_{0.29}$ | 141 |
| Ex. 2 | 90 | 10 | $(La_{0.80}Ce_{0.14}Pr_{0.02}Nd_{0.04})Ni_{3.69}Co_{0.90}Mn_{0.10}Al_{0.29}$ | 145 |
| Comp. Ex. 2 | 98 | 2 | $(La_{0.17}Pr_{0.33}Nd_{0.33}Mg_{0.17})Ni_{2.6}Mn_{0.5}Al_{0.2}$ | 109 |
| Comp. Ex. 1 | 100 | 0 | — | 100 |

As in the case of Examples 1 to 7 above, the results demonstrate that the alkaline storage battery of Example 8, which contained the second hydrogen-absorbing alloy powder having a greater Co content than the first hydrogen-absorbing alloy powder, exhibited a remarkable improvement in cycle life, as with the alkaline storage battery of Example 2 above, over the alkaline storage battery of Comparative Example 1

In contrast, the alkaline storage battery of Comparative Example 2, in which the second hydrogen-absorbing alloy powder contained Mn but did not contain Co, showed poorer cycle life than the alkaline storage batteries of the foregoing Examples although it showed a slight improvement in cycle life over the alkaline storage battery of Comparative Example 1.

This result suggests that it is necessary to use a hydrogen-absorbing alloy having a greater Co content as the second hydrogen-absorbing alloy.

Although the present invention has been fully described by way of examples, it is to be noted that various changes and modification will be apparent to those skilled in the art.

Therefore, unless otherwise such changes and modifications depart from the scope of the present invention, they should be construed as being included therein.

What is claimed is:

1. A hydrogen-absorbing alloy electrode comprising:
   a first hydrogen-absorbing alloy containing at least a rare-earth element, magnesium, nickel, and aluminum, and cobalt in an amount of 2.0 weight % or less, and having an intensity ratio $I_A/I_B$ of 0.1 or greater in X-ray diffraction analysis using Cu—Kα radiation as an X-ray source, where $I_A$ is the strongest peak intensity that appears in the range of $2\theta=31°$ to $33°$, and $I_B$ is the strongest peak intensity that appears in the range of $2\theta=40°$ to $44°$; and
   a second hydrogen-absorbing alloy having a $CaCu_5$ crystal structure and a cobalt content greater than the first hydrogen-absorbing alloy, and being added to the first hydrogen-absorbing alloy, wherein the second hydrogen-absorbing alloy has a smaller average particle diameter than that of the first hydrogen-absorbing alloy.

2. The hydrogen-absorbing alloy electrode according to claim 1, wherein the amount of cobalt contained in the second hydrogen-absorbing alloy is 25 weight % or greater with respect to the total amount of cobalt contained in the first hydrogen-absorbing alloy and the second hydrogen-absorbing alloy.

3. The hydrogen-absorbing alloy electrode according to claim 2, wherein the amount of cobalt contained in the second hydrogen-absorbing alloy is within the range of from 50 to 75 weight % with respect to the total amount of cobalt contained in the first hydrogen-absorbing alloy and the second hydrogen-absorbing alloy.

4. The hydrogen-absorbing alloy electrode according to claim 1, wherein the amount of the second hydrogen-absorbing alloy is within the range of from 5 to 50 weight % with respect to the total amount of the first hydrogen-absorbing alloy and the second hydrogen-absorbing alloy.

5. The hydrogen-absorbing alloy electrode according to claim 4, wherein the amount of the second hydrogen-absorbing alloy is within the range of from 15 to 30 weight % with respect to the total amount of the first hydrogen-absorbing alloy and the second hydrogen-absorbing alloy.

6. The hydrogen-absorbing alloy electrode according to claim 1, wherein the first hydrogen-absorbing alloy is represented by the general formula $Ln_{1-x}Mg_xNi_{y-a}Al_a$, where Ln is an element selected from rare-earth elements, $0.10 \leq x \leq 0.30$, $3 \leq y \leq 3.6$, and $0 \leq a \leq 0.3$.

7. The hydrogen-absorbing alloy electrode according to claim 6, wherein, in the hydrogen-absorbing alloy represented by the general formula, a portion or portions of the Ln and/or Ni is substituted by at least one element selected from the group consisting of V, Nb, Ta, Cr, Mo, Mn, Fe, Co, Ga, Zn, Sn, In, Cu, Si, P, and B.

8. An alkaline storage battery, comprising a positive electrode, a negative electrode, a separator, and an alkaline electrolyte solution, the negative electrode being a hydrogen-absorbing alloy electrode according to claim 1.

* * * * *